C. V. HALL.
TIRE PATCH.
APPLICATION FILED AUG. 20, 1921.

1,433,006.

Patented Oct. 24, 1922.

Charles V. Hall.
Inventor

By Douglas A. Gass.
Attorney

Patented Oct. 24, 1922.

1,433,006

UNITED STATES PATENT OFFICE.

CHARLES V. HALL, OF WASHINGTON, DISTRICT OF COLUMBIA.

TIRE PATCH.

Application filed August 20, 1921. Serial No. 493,843.

*To all whom it may concern:*

Be it known that CHARLES V. HALL, a citizen of the United States, residing at Washington, District of Columbia, has invented certain new and useful Improvements in Tire Patches, of which the following is a specification.

This invention relates to repairing devices for use in connection with pneumatic tires, and has particular reference to tire patches to be inserted in the casing or shoe of inflatable motor vehicle tires.

The primary object of the invention is to provide a patch of such character as to be readily inserted in the tire casing so as to fully protect the inner tube and which is so anchored or fastened therein as to be held against rotative or circumferential movement with respect to the tire.

A further object is to provide means of a simple and improved nature for firmly maintaining the patch in proper position bridging the cut or break in the casing or shoe, and which will be prevented from bulging or protruding through the break.

A still further object is to so construct the patch and assemble the same with respect to the inner and outer casings as to prevent rubbing or chafing, thus obviating wearing of the inner tube, an objection common to devices heretofore proposed for the accomplishment of the same purposes.

Still further and particular objects are to provide a tire patch for the purposes stated which is of extremely simple construction and which may be manufactured at low cost; which is readily applicable to the tire; which is as easily applied as other devices now used for the same purposes; which requires no skill in its proper application; which may be quickly applied to the tire; which is adaptable to all sizes of tires; and which affords protection to the inner tube whether the cut or break in the casing be in the tread or whether it be a rim cut.

With these objects in view, together with others which will appear as the description proceeds, the invention consists in the novel construction and arrangement of parts, all as will be described more fully hereinafter, illustrated in the drawings, and particularly pointed out in the claims.

In carrying out the invention, I propose to apply the patch to the injured element of the tire so as to properly span, bridge or cover and protect the weakened or cut portion, and to secure the patch so positioned as to positively prevent the same moving or shifting with respect to the injured part, either laterally or circumferentially of the wheel, as well as to prevent the patch or a portion thereof protruding or bulging out when closing a break or hole in either the inner tube or casing. The patch element is preferably formed of flexible, tough, non-elastic material, of any desired or required material and size, and being of such thickness as to withstand the strains, stresses and wear to which the patch must necessarily be subjected. As an element suitable for an anchoring device or means for the patch, the valve stem of the inflatable tube is used. The patch of my invention, in being applied as set forth, is secured to the valve stem of the tire, and the means whereby the said valve stem and the patch are connected may assume various forms or devices. In the present instance, as one practical embodiment of the invention, the patch is shown as applied to the tire between the inner tube and the outer casing, it being assumed that the break or injured member is the casing, and the said patch near one edge is provided with an opening sufficiently large to permit of the valve stem passing through and snugly fitting the same.

Referring now more particularly to the drawings, 4 represents the felly of the vehicle wheel, 5 the demountable or tire holding rim, 6 the casing or shoe of the tire, and 7 the inner tube therefor. The inner tube is equipped with the inflating tube or valve stem indicated at 8, which projects through the wheel and demountable rims as is well known. These parts are all standard, and while in the present instance one particular form of inflatable tire is shown, for the purposes of illustration, it will be understood that the invention is equally as well carried out in connection with other types of pneumatic tires.

Figure 2:
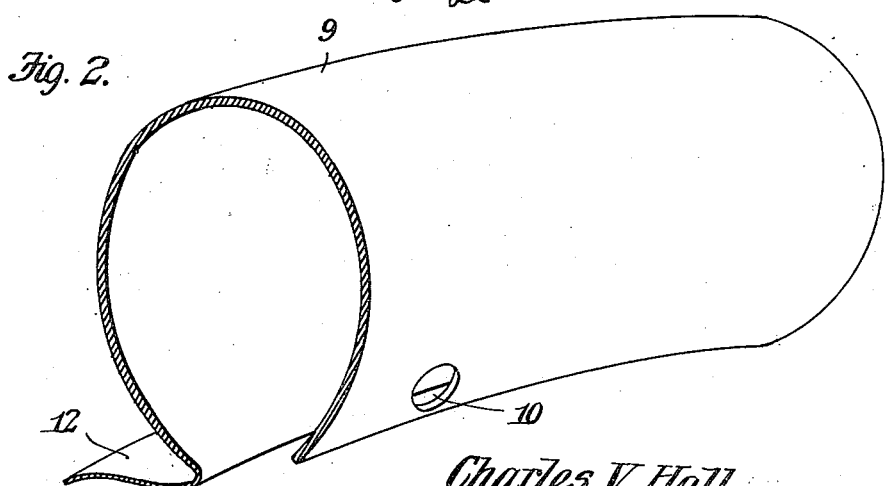
Fig. 2 is a perspective view, parts broken away, of the patch removed from the tire.

The improved tire patch is indicated generally at 9, and includes a strip or band of tough flexible material of suitable length and of a width to substantially pass entirely around the inner tube 7. The patch is shaped longitudinally so as to conform substantially to the curvature or circumference of the tire, and also fits snugly against the inner walls of the outer tube or casing. The patch is of such thickness as to resist wear and abrasion, and normally assumes the shape and position shown in Fig. 2 of the drawing.

The thickened portion of the patch is of such extent as to enclose the inner tube, and is provided near one edge with an opening 10 of such size as to accommodate the stem 8 of the tube inflating device. The opening 10 is preferably located midway the ends of the patch and in the thickened portion thereof. The opposite longitudinal edge of the patch is provided with a thin flap or wing 12 coextensive with the length of the patch, and adapted to be anchored between the bead of the casing and the supporting rim therefor.

Figure 3:
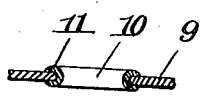
Fig. 3 is a fragmentary sectional view showing a reinforcing means which may be used in carrying out the invention.

In Fig. 3 of the drawings, there is shown a portion of the tire patch, the opening 10 thereof being reinforced with a ring or fold 11. By reinforcing the opening, it is apparent that danger of pulling out of the opening will be overcome and the life of the patch therefore lengthened.

In applying the patch to the tire, the casing is removed from the rim and the tube is taken from the casing. The patch is inserted in the casing so as to bridge the cut or break therein, with the opening 10 located over the space between the adjacent edges of the casing beads. It may be found more expedient to first apply the patch to the inner tube before the latter is inserted in the casing, and this is done by engaging the patch over the tube with the tube inflating stem protruding through the opening 10. The tube and patch are then inserted in the casing, with the patch so positioned as to properly bridge the cut or tear in the latter. The flap at the opposite or free edge of the patch is passed out and around the casing bead, and when the casing is applied to the rim this flap is securely compressed between the bead and the bead holding devices.

Figure 1:
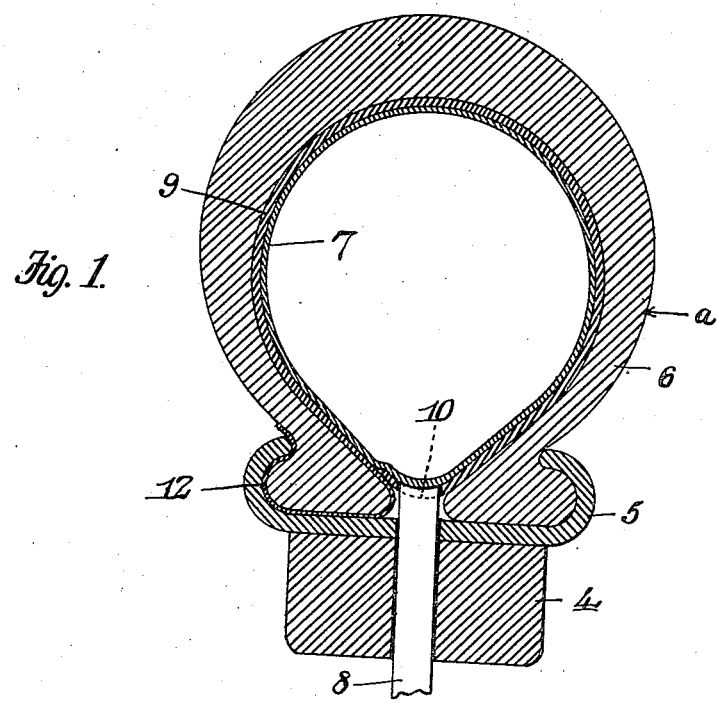
Fig. 1 is a sectional view taken through a pneumatic tire of familiar construction and illustrating the application of a tire patch constructed and assembled in acordance with the invention.

With the patch thus applied, it is apparent that the hole or cut in the casing will be properly closed and the inner tube will be protected against damage. By reason of the patch being positively held to the inner tube, shifting of the same will be prevented, as will shifting or relative movement between the inner tube and patch as well as between the casing and patch. This positive holding of the patch will prevent the same from becoming misplaced and exposing the inner tube through the cut or hole in the casing. It will be understood, of course, that when the tire is inflated after the patch has been applied, the pressure within the tube will cause the patch to be firmly held between the inner tube and casing. This pressure cannot, however, operate to cause the patch to bulge out of the hole or cut in the casing, due to the positive manner in which the patch is held within the casing. In instances where a rim cut is to be repaired, the patch will be applied with its apertured side nearest the rim cut. For instance, in Fig. 1 the patch is applied for a rim cut in the side of the casing indicated at a, and it is obvious that air pressure within the tube cannot force the patch to bulge through the rim cut, by reason of the patch being held positively by the valve stem 8; little or no outward pressure being exerted upon the flap edge of the patch at the other side of the casing. In instances where the cut in the casing happens upon one or the other side of the casing, the patch will be applied with its apertured side nearest the cut.

From the foregoing, it is apparent that I have provided a tire repair patch of extremely simple construction and which may be easily and quickly applied to the injured tire with assurance of proper sealing of the hole or cut. As the patch is held positively within the casing and cannot bulge through the opening in the casing, danger of damage to or puncturing of the patch is overcome. It is also obvious that damage to the inner tube and patch, heretofore due to shifting or oscillating of the patch relative to the inner tube, is prevented.

In the present instance, for purposes of illustration, there is shown one opening 10 in the patch, but it is apparent that two or more of such openings may be provided therein if required or believed necessary. By applying a ferrule or ring, or other reinforcing element, such as stitching, around the opening 10, danger of the opening pulling out or stretching is overcome.

While the above is a description of the invention in its preferred embodiment, it is obvious that minor changes in the details of construction and method of application may be resorted to without departing from the invention as defined by the claims.

I claim :—

1. In a tire patch, a protective strip adapted for insertion in a tire casing between the latter and the inner tube, the said strip being of such size as to pass laterally entirely around the inner tube, and an element on said inner tube to be engaged with said patch whereby the latter will be held against lateral as well as circumferential movement in said casing.

2. In a tire patch, a protective strip for insertion in a tire casing between the latter and the inner tube, the said strip being of such width as to pass substantially entirely around the inner tube, and the said strip having an opening therein to receive the valve stem of the said inner tube.

3. In a tire patch, a strip or sheet of protective material adapted for insertion in a tire casing between the latter and the inner tube thereof, and means positively connecting the inner tube and patch whereby the latter will be held against movement with respect to said tube.

4. In a tire patch, a strip or sheet of non-elastic material adapted to enclose a portion of the inner tube of a tire, and cooperating means on the patch and inner tube whereby the former will be held positively against movement relative to the said tube.

5. In a tire patch, a strip or sheet of protective material adapted to enclose a portion of the inner tube of a tire, and the said strip having an opening in its body portion near one edge thereof to receive the valve stem of the tube.

6. In a tire patch, a sheet of protective material adapted to enclose a portion of the inner tube of the tire, and means on the patch cooperating with the valve stem of the tube for holding the patch to the said tube.

7. The combination with a tire casing and the inner tube thereof, of a patch adapted to be inserted in the casing between the latter and the inner tube, the said patch having an opening therein to receive the valve stem of the inner tube, and a wing on said patch remote from said opening to be clamped between the casing and its holding rim.

8. In a tire patch, a strip of protective material adapted to be positioned within a casing and to circumscribe the inner tube therein, and means whereby said strip may be anchored upon element independent of the patch and housed by said casing.

9. In a tire patch, a strip of protective material adapted to be placed within a casing between the latter and the inner tube, means at one end of said strip for engagement with said tube and means at the opposite edge whereby the said strip may be held between a wheel rim and tire shoe.

10. In a tire patch, a strip of flexible material of substantially short length adapted to be applied to a tube to cover an abrasion or weakness therein and being of a width greater than the transverse circumference of the tube, the said strip having an opening near one edge thereof to receive a projection on the tube, and means independent of the tube whereby the opposite edge of the strip may be maintained against movement.

In testimony whereof I affix my signature.

CHARLES V. HALL.